(12) United States Patent
Kersten et al.

(10) Patent No.: US 8,960,336 B2
(45) Date of Patent: Feb. 24, 2015

(54) ROCK DRILL BIT

(75) Inventors: Heinrich Kersten, Verden (DE); Joerg Frommeyer, Wallenhorst (DE); Sven Elmers, Dinklage (DE); Hermann Albers, Dinklage (DE); Ranier Lampe, Dinklage (DE)

(73) Assignee: Heller Tools GmbH, Dinklage (DE)

( * ) Notice: Subject to any disclaimer, the term of this patent is extended or adjusted under 35 U.S.C. 154(b) by 711 days.

(21) Appl. No.: 13/120,236

(22) PCT Filed: Sep. 3, 2009

(86) PCT No.: PCT/US2009/055861
§ 371 (c)(1),
(2), (4) Date: Mar. 22, 2011

(87) PCT Pub. No.: WO2010/036498
PCT Pub. Date: Apr. 1, 2010

(65) Prior Publication Data
US 2011/0168453 A1 Jul. 14, 2011

(30) Foreign Application Priority Data

Sep. 23, 2008 (DE) .................. 10 2008 048 599
Mar. 18, 2009 (DE) .................. 20 2009 003 695 U
Apr. 21, 2009 (DE) .................. 20 2009 005 847 U

(51) Int. Cl.
*E21B 10/40* (2006.01)
*B23B 51/02* (2006.01)
(Continued)

(52) U.S. Cl.
CPC .............. *B23B 51/02* (2013.01); *E21B 10/445* (2013.01); *E21B 10/58* (2013.01); *B23B 2226/75* (2013.01);
(Continued)

(58) Field of Classification Search
USPC ................ 175/371, 415, 420, 427, 394, 398, 175/420.1; 408/227, 230, 223, 244
See application file for complete search history.

(56) References Cited

U.S. PATENT DOCUMENTS 2,484,365 A * 10/1949 Wilsher ........................ 175/415
2,507,222 A 5/1950 Phipps
(Continued)

FOREIGN PATENT DOCUMENTS

CN 1309007 A 8/2001
CN 1350914 A 5/2002
(Continued)

OTHER PUBLICATIONS

German Search Report for Application No. 10 2008 048 599.3, mailed Jun. 2, 2009.
(Continued)

*Primary Examiner* — David Bagnell
*Assistant Examiner* — Taras P Bemko
(74) *Attorney, Agent, or Firm* — Lowe Hauptman & Ham LLC

(57) ABSTRACT

A rock drill bit having a shank fitted with a clamping end and a drilling tip located from the clamping end. The drilling tip has at least three blades and a central zone centered on a drill bit axis. The blades each include on a top side thereof a lip constituted by a leading chipping face and a trailing flank. The lips substantially converge onto each other within a the central zone of the drilling tip, wherein in the central zone, a long lip of the lips runs through the drill bit axis and has a commensurate overshoot segment extending beyond the drill bit axis.

15 Claims, 16 Drawing Sheets

(51) Int. Cl.
  *E21B 10/44* (2006.01)
  *E21B 10/58* (2006.01)

(52) U.S. Cl.
  CPC ..... *B23B 2251/082* (2013.01); *B23B 2251/085* (2013.01); *B23B 2251/14* (2013.01); *B23B 2251/18* (2013.01); *B23B 2251/202* (2013.01); *B23B 2251/282* (2013.01); *B23B 2251/287* (2013.01); *B23B 2251/50* (2013.01); *B23B 2251/70* (2013.01)
  USPC ............ 175/415; 175/398; 408/230; 408/223

(56) References Cited

U.S. PATENT DOCUMENTS

| | | | |
|---|---|---|---|
| 3,140,749 A | 7/1964 | Dionisotti | |
| 4,951,761 A | 8/1990 | Peetz et al. | |
| 6,450,273 B1 | 9/2002 | Kleine et al. | |
| 6,588,520 B2 | 7/2003 | Hauptmann | |
| 2001/0013429 A1 | 8/2001 | Hauptmann et al. | |
| 2001/0013430 A1 | 8/2001 | Hauptmann et al. | |
| 2002/0053473 A1 | 5/2002 | Knoller | |
| 2005/0025594 A1* | 2/2005 | Lindblom | 408/227 |
| 2010/0054884 A1* | 3/2010 | Masuda et al. | 408/230 |

FOREIGN PATENT DOCUMENTS

| | | |
|---|---|---|
| DE | 757076 | 5/1951 |
| DE | 2348874 | 4/1975 |
| DE | 202007002120 | 6/2008 |
| EP | 0347602 | 12/1989 |
| EP | 1083295 | 3/2001 |
| EP | 1125663 | 8/2001 |
| EP | 1217165 | 2/2002 |
| EP | 1184535 | 3/2002 |
| FR | 2779366 | 12/1999 |
| GB | 530113 | 12/1940 |
| WO | 03103914 | 12/2003 |
| WO | WO 2008001412 A1 * | 1/2008 |
| WO | 2008095719 | 8/2008 |

OTHER PUBLICATIONS

International Search Report for PCT/US2009055861 mailed Nov. 26, 2009.

* cited by examiner

ROCK DRILL BIT

RELATED APPLICATIONS

The present application is a national phase of PCT/US2009/066861, filed Sep. 3, 2009 and is based on, and claims the priority from, German Application Numbers 102008048599.3, filed Sep. 23, 2008; 202009003695.2, filed Mar. 28, 2009; and 202009005847.6, filed Apr. 21,2009.

TECHNICAL FIELD

The present invention relates to a rock drill bit in particular being used in hammer, impact and/or rotary drilling equipment.

BACKGROUND

Such a drill bit is appropriate for drilling concrete or steel-reinforced concrete, also for other masonry, rock or the like. Especially high requirements are set on the rock drill bit when drilling metallically reinforced materials. In this case the rock drill bit's lip/blade geometry precludes "controlled" chipping—as known for metal drill bits—the reinforced material. Instead the attempt must be made to use an appropriate drill bit angular speed and by applying as high a pressure as possible on the surface being worked or to attain drilling through such metallically sheathed material. Such an approach is a mixture of chipping and plastic deformation. High stresses on the rock drill bit are involved, in particular as regards the cutting edges, i.e. the lips, of the rock drill bit.

Significant criteria to control the geometry of the rock drill bit are simple centering, the rate of drilling advance/progress, long service life, also low wear.

SUMMARY

The present invention starts from the rock drill bit disclosed in the German patent document DE 20 2007 002 120 U1 relating to a drilling head comprising—in topview—three alar blades each fitted at its top side with a lip. The lips each are constituted by a leading chipping face and a trailing flank. The lips symmetrically converge with one another in a central zone aligned with the drill bit axis.

In the design of the known rock drill bit, the lips are axially set back in the central zone in a manner that said zone is narrowed. It was found that, when drilling reinforced materials, a centering tip does not contribute to drilling progress because the drilling velocity practically disappearing near/at the center.

In particular as regards metallically reinforced materials, the known drill bit already offers good drilling progress per unit time.

The objective of the present invention is to so further design and further develop the known rock drill bit that the attainable drilling progress per unit time shall be raised further.

The above problem is solved for a rock drill bit by the following one or more embodiments.

The present invention offers the significant insight to render essentially asymmetric the central zone into which the lips substantially converge from the outside toward the inside.

In particular the present invention proposes that, in said central zone, a single lip, hereafter also termed "long lip", shall run through the drill bit axis and therefore comprises an overshoot segment extending beyond the drilling axis.

The above problem is solved for a rock drill bit by the following one or more embodiments.

In this respect as well, the concept of the present invention, namely to make asymmetrical the central zone wherein the lips substantially converge from the outside to the inside, again is essential.

Accordingly, within said central zone, a single lip, also termed "long lip", runs past the drill bit axis and therefore comprises an overshoot segment extending a distance away from it and beyond.

Be it borne in mind that the terminology "converging substantially" not necessarily implies that the lips shall impinge each other. It merely denotes that they approach each other within the central zone.

The expression "the lips running beside and past the drill bit axis" denotes that as seen in projection on a projection surface orthogonal to the drill bit axis and following the course of the lip, the lip normal vector approaches the drill bit axis, then intersects the drill bit axis and lastly beyond the drill bit axis moves away from said drill bit axis.

Both when passing through the drill bit axis and when passing beside it, the overshoot segment is that segment which in the above sense is situated beyond the drill bit axis.

It is critical that only a single long lip defined above be used. Because of the above design of said long lip, said central zone asymmetry is attained. This long lip in a sense acts thereby as a chisel edge, such a chisel edge having been observed being especially advantageous when drilling through reinforced material.

The proposed solution of the present invention however also extends beyond drilling reinforced materials. The asymmetric design of the central zone entails a drilling behavior which can be observed to be quite advantageous in general when drilling hard rocks, especially hard concrete or the like.

In the preferred embodiment of FIG. 3, all remaining lips in the central zone do not pass through the drill bit axis. In alternative or additional manner provides that, in the central zone, all remaining lips shall not run beside and past the drill bit axis.

In an especially preferred embodiment mode, the remaining lips run neither through drill bit axis nor beside and past it.

In a preferred embodiment, the axial height of the lips within the central zone substantially tapers toward the drill bit axis. The term "axial height" in the present context is the axial distance between the particular point on the lip and the shank's clamping end. Due to said axial recessing of the lips in the central zone, the region of small or vanishing velocity vectors is removed from the direct operational region on the material being drilled, such a feature being especially advantageous when drilling reinforced materials.

In the preferred embodiment, the lips are fitted in an external edge region of the drill bit with an axial boss to significantly improve drill bit guidance.

According to a preferred embodiment, the long lip constitutes a chisel edge in the region of the drill bit axis, said chisel edge's radial outer ends projecting axially from the center of the chisel edge between them. Seen in sideview, the chisel edge of the preferred embodiment is concave.

When implementing a chisel edge as discussed above, the asymmetrical convergence of the lips in the central zone is moderated by some degree of symmetry which, when properly designed, allows optimal guidance. The two axially projecting chisel edge ends moreover allow especially good drilling progress due to the resulting force concentration at the ends.

As regards the preferred embodiment, in each case one of the junction elements between mutually facing side surfaces of adjacent lips comprises a lateral attachment receiving part of the overshoot segment of the long lip. As a result the overshoot segment of the long lip may be elongated within a wide range.

In a "minimized version" of the present invention, only one lateral attachment is used. This feature saves material and the resulting asymmetry inhibits vibrations.

Moreover a further junction element and in particular all junction elements may be fitted with identical attachment(s). This design is advantageous in manufacturing.

The present invention is elucidated below by one illustrative embodiment mode and in relation to the appended drawings.

DETAILED DESCRIPTION

Figure 2:
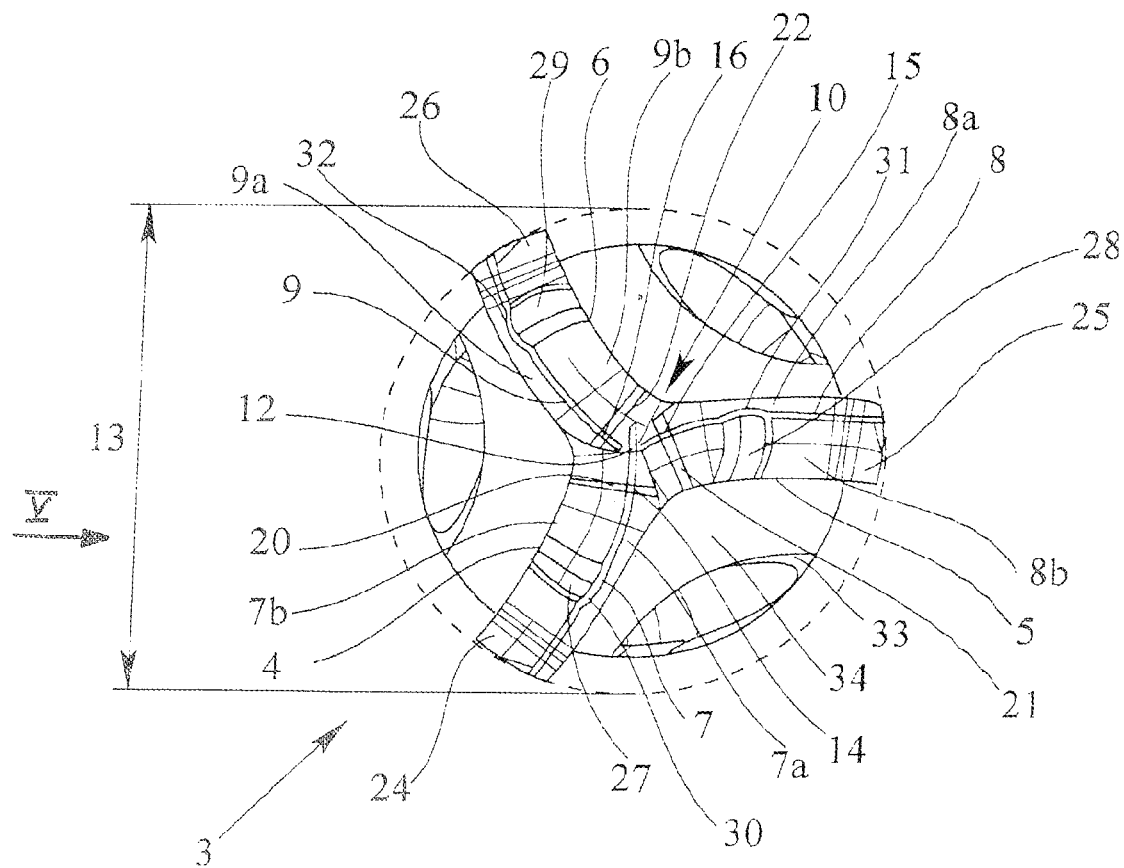
FIG. 2 is the rock drill bit of FIG. 1 seen in topview.

The rock drill bit of the present invention shown in appended drawings comprises a shank 1 fitted with a clamping end 2, and away from latter at the other shank end, with a drilling tip 3. FIG. 2 indicates that in this preferred instance, the drilling tip 3 comprises precisely three blades 4, 5, 6 which look alar in topview and are fitted at their upper sides each with a lip 7, 8, 9. The lips 7, 8, 9 are each constituted by a leading cutting surface 7a, 8a, 9a and by a trailing flank 7b, 8b, 9b. The lips 7, 8, 9 basically converge within a central zone 10 centered on the bit axis 11. In other words, the lips 7, 8, 9 approach each other in the vicinity of the bit axis 11.

In principle more than three blades each fitted with its own lip, also may be used. The present disclosure is elucidated below using a triple-blade design, which, while preferred, is not limitative.

A critical feature of the present invention requires that, within said central zone, a single lip 7, hereafter also denoted as "long lip", shall run through the bit axis 11 and accordingly shall comprise an overshoot segment 12 projecting beyond said bit axis.

In this, the preferred case, all remaining lips 8, 9 run neither through the bit axis 11 nor beside and past it. This situation is clearly shown in FIG. 3. It follows from this Figure that the solution of the present invention creates an asymmetric central zone 10 of the rock drill bit. The related advantages already were discussed above.

The aforementioned asymmetry is best attained using configurations devoid of directly mutually opposite lips. The expression "mutually opposite lips" in this context are those lips of which the main orientations are offset by 180°.

In an omitted alternative of the present invention, the long lip 7 does not pass through the bit axis 11 but runs beside and past it. The resultant effect, namely that the central zone 10 is asymmetrical with respect to the bit axis 11, may be attained in a similar way. In the present disclosure, both alternatives are claimed per se. As regards the above cited long lip 7, it is shall advantageously pass the said bit axis at a distance less than 5% of the bit diameter 13, preferably less than 3%, and even more preferably less than 1%.

The central zone 10 of the rock drill bit is that area conventionally containing a centering element or similar. Preferably therefore the configuration of the invention is such that the central zone 10 when seen in topview is situated within a circle about the bit axis 11, said circle's diameter being less than 30%, preferably less than 20%, and even more preferably less than 10% of the bit diameter 13.

The overshoot segment 12 of the long lip 7 preferably is designed to be situated just within the central zone 10. Preferably the overshoot segment 12 of the long lip 7 is larger than 3%, preferably larger than 5% of the bit diameter 13. Preferably furthermore the length of the overshoot segment 12 of the long lip 7 is less than 20%, in particular less than 10% of the bit diameter 13. Preferably again, the overshoot segment 12 of the long lip 7 runs into the flank 9b of an adjacent lip 9.

In this instance, and preferably so, the axial height of the lips 7, 8 on the whole decreases within the central zone 10 in the direction of the bit axis 11. Looking at the lips 7, 8, 9 from the outside inwardly toward the bit axis 11, it will be noticed that an area is provided within the central zone 10 wherein the lips 7, 8, 9 are axially set back. This feature is shown more clearly in FIGS. 4 and 5.

In this instance and preferably so, the lips 7, 8, 9 each comprise a kink site 14, 15, 16, the axial height of the lips 7, 8, 9 commensurately decreasing from said kink site toward the bit axis 11. Appropriately the lips 7, 8, 9 are fitted with corresponding bevels 17, 18, 19.

A significant feature of the rock drill bit of the present invention is that, within the central zone 10, the long lip 7 on account of the aforementioned decrease in axial height is shallower than the corresponding course of the remaining lips 8, 9. The resulting effect is discussed further below in relation to a three-dimensional embodiment.

Especially effective guidance of the rock drill bit is attained by keeping the axial height at the kink site 14, 15, 16 substantially identical for all lips 7, 8, 9.

Figure 3:
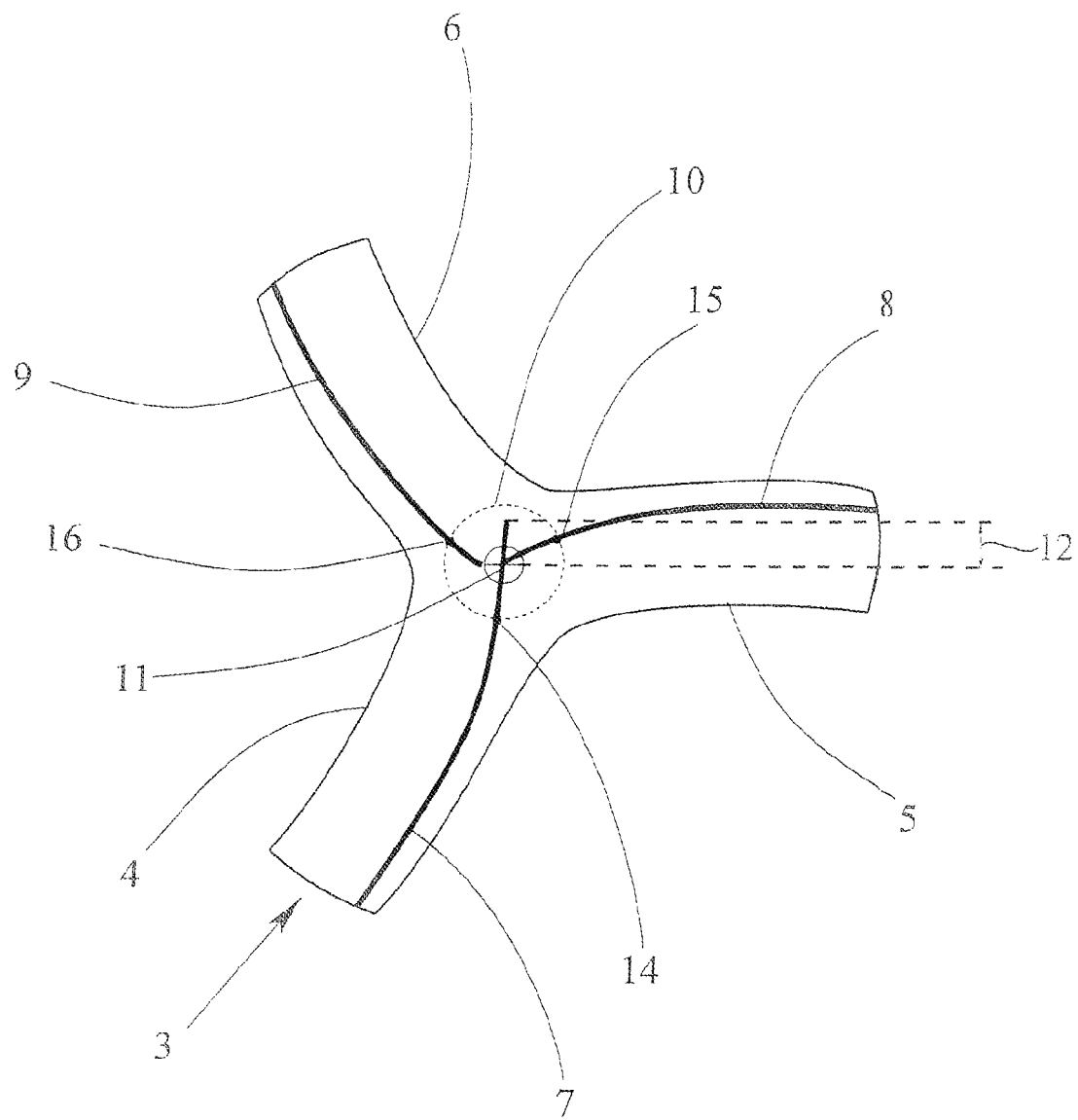
FIG. 3 schematically shows the rock drill bit blades of FIG. 2.

Guidance may be further enhanced by configuring, as seen in topview, the kink sites 14, 15, 16 of all lips 7, 8, 9 on a circle centered on the bit axis 11. This feature is shown in FIG. 3.

Preferably all kink sites 14, 15, 16 are arrayed within the central zone 10. However part of the kink sites 14, 15, 16 also might be configured outside the central zone 10.

Figure 4:
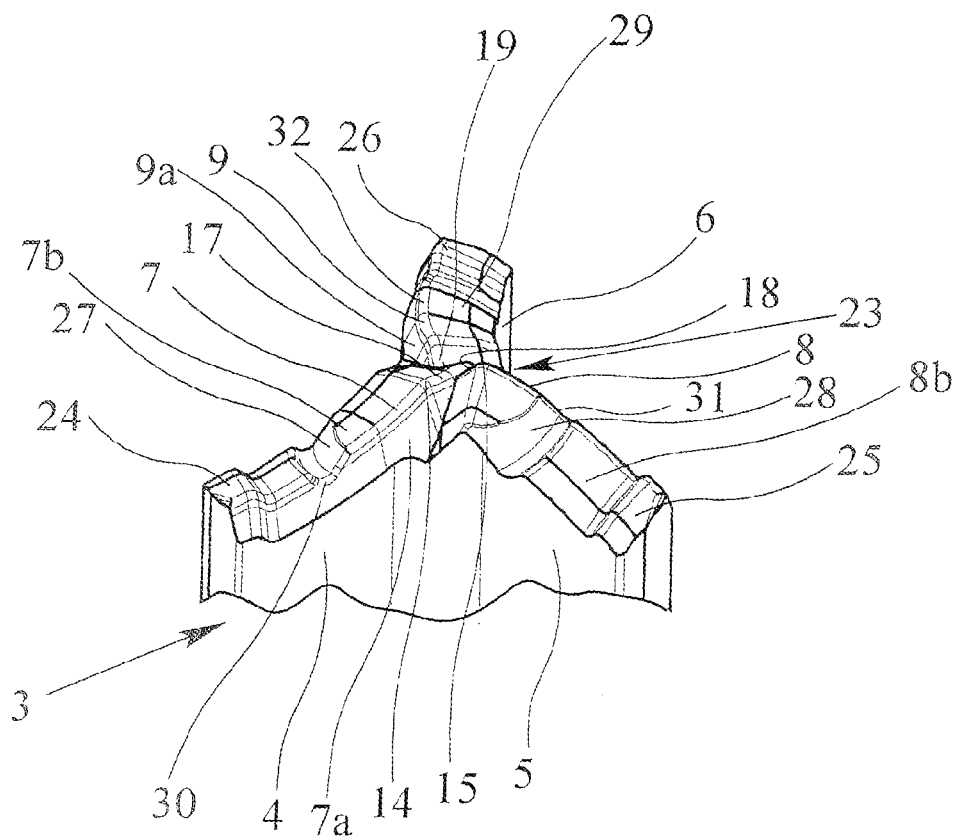
FIG. 4 is a perspective of the blades of the rock drill bit of FIG. 1.
Figure 5:
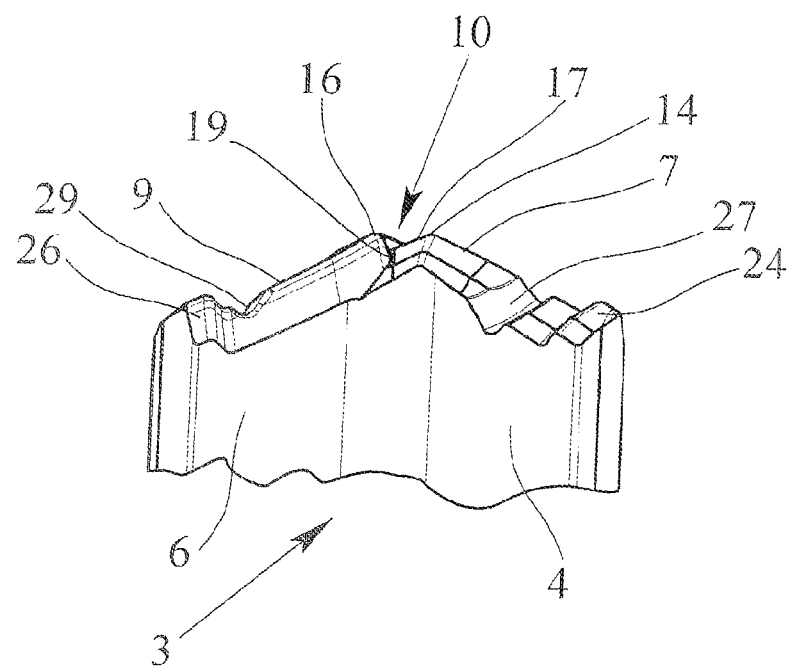
FIG. 5 shows the blades of the rock drill bit of FIG. 1 when seen from V in FIG. 2.

FIGS. 4 and 5 indicate that the axial height of the lips 7, 8, 9 on the whole does rise from the outside to the inside toward the kink site 14, 15, 16. This means that the kink site 14, 15, 16 of a lip 7, 8, 9 is a geometric maximum site as regards the axial height of the said lip. This feature is especially advantageous regarding drilling progress.

Like the structure of the lips 7, 8, 9, the above kink sites 14, 15, 16 are based on a special design of the corresponding flanks 7b, 8b, 9b and chipping face 7a, 8a, 9a. Correspondingly a flank edge 20, 21, 22 running in particular perpendicularly to the particular lip 7, 8, 9 starts from the associated flank 7a, 8b, 9b where same begins to axially decrease toward the bit axis 11. A corresponding feature applies to the chipping face 7a, 8a, 9a.

In the shown and preferred embodiment, the drilling head 13 is fitted with exactly three blades 4, 5, 6 which are alar in topview. The main directions assumed by two adjacent blades 4, 5, 6 in this instance are offset by about 120°. In principle another angular separation might be selected is also, in particular an asymmetrical one. An asymmetrical angular array offers advantages in vibration control and personal comfort.

As regards the above triple-blade design, and as seen in projection onto a projection plane perpendicular to the bit axis 11, the flank edge 20 of the flank 7b associated with the long lip 7 advantageously subtends an angle of about 120° and of about 240° with the flank edges 21, 22 of the remaining lips 8, 9. This feature assures that the basic structure of the rock drill bit obeys a given geometrically basic symmetry.

As already mentioned above, the relatively flat geometry of the long lip 7 in the central zone 10 results in a very special effect that can be inferred from the drawing of FIG. 4. Therein, the flank 8b of a lip 8 together with the flank 9b of a further lip 9 subtend a trough 23 through which passes the long lip 7.

The rock drill bit of the present invention offers a further significant feature regarding its guidance control. In this instance, the lips 7, 8, 9 each are fitted in an outer edge area with an axial rise 24, 25, 26. The term "axial rise" means that this region is raised axially relative to the lip 7, 8, 9 elsewhere.

In this respect it is especially advantageous that the edge portions of the blades 4, 5, 6 shall radially project above the shank 1. In especially advantageous manner, the rise 24, 25, 26 is configured within the rise portion. Accordingly the rise 24, 25, 26 is selected to run over less than 10% of the particular lip length.

Conceivably again, however, when seen in topview, the rise 24, 25, 26 is configured entirely within the outside diameter of the shank 1. In another advantageous embodiment of the invention, the rise 24, 25, 26 runs from a portion within the outside diameter of the shaft 1 into the protruding portion.

FIG. 4 also indicates that the rise 24, 25, 26 runs over the full width of the particular flank 7b, 8b, 9b. This feature advantageously affects the above guidance control.

In principle, seen in topview, the lips 7, 8, 9 of the blades 4, 5, 6 may run substantially rectilinearly. In present instance, however, and again as seen in topview, the lips (7, 8, 9) of the blades (4, 5, 6) run along an arc from the inside to the outside. Moreover, the curvature of the lips 7, 8, 9 in the central zone 10 substantially corresponds to the curvature of the lips 7, 8, 9 elsewhere.

In a preferred embodiment mode of the present invention, the lips 7, 8, 9 of the blades 4, 5, 6 run from the inside to the outside along an arc of which the direction of curvature is opposite that of the rock drill bit's direction of rotation. In the illustrative embodiment shown in FIG. 2, the rock drill bit's direction of rotation is counter-clockwise and the above direction of curvature of the lips 7, 8, 9 is clockwise.

Another significant aspect of the solution of the present disclosure is that the flanks 7b, 8b, 9b of the lips 7, 8, 9 each comprise at least one concave recess—flank trough which together with the [chip-flow] face 7a, 8a, 9a subtends an essentially concave recess 30, 31, 32 of the lip 7, 8, 9—lip trough—, preferably the lip troughs 30, 31, 32 of different lips 7, 8, 9 being mutually radially offset. Accordingly the lip troughs 30, 31, 32 are configured almost complementarily to each other. This asymmetry offers advantages in the hammer-mode operation on inhomogeneous materials, a particular workpiece site to be processed being processed by complementary lips 7, 8, 9. The above designs—which comprise arcuate/bent lips 7, 8, 9 and concave recesses in the lips 7, 8, 9—are the object of the patent document DE 20 2007 002 120 U! of present applicant, its content being commensurately incorporated into the present application.

Be it also borne in mind that the evacuation groove 33 is designed in a special way in the vicinity of the drilling tip 3. That is, in the vicinity of the drilling tip 3, the evacuation groove 33 runs axially in one segment, that not being helical. This segment of the evacuation groove 33 runs upward as far as the substantially conical end face 34 of the shank 1. In an omitted view the invention includes a further improvement of chip evacuation, namely to fit the transition from the evacuation groove 33 to the end face of the shank 34 with an additional bevel or the like.

Figure 1:
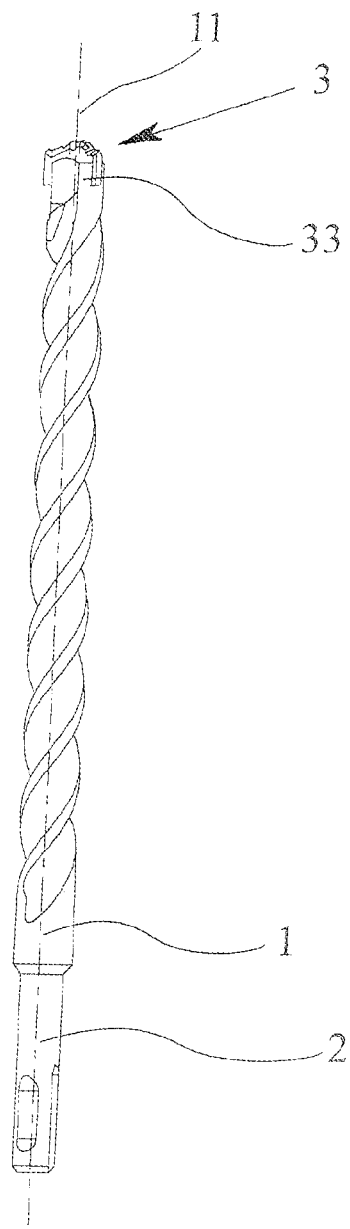
FIG. 1 is a sideview of an illustrative embodiment of a rock drill bit.

FIGS. 6 through 9 show the second preferred embodiment mode of the blades of a rock drill bit of the present invention of which the design substantially corresponds to that shown in FIGS. 1 and 2. Appropriate reference is made to these earlier discussions.

This second embodiment includes the significant feature that the long lip 7 acts as a chisel edge 35 in the vicinity of the bit axis 11, said chisel edge comprising two radially outer ends 36, 37. One of the ends, 37, is associated with the overshoot segment 12 of the long lip 7. By considering FIGS. 6 and 8 jointly, they indicate that the two ends 36, 37 of the chisel edge 35 axially project beyond the center of the chisel edge 35 between them. The advantages attained by this design regarding guidance control on one hand and drilling progress on the other already were discussed earlier.

Guidance control furthermore was observed being favorably affected by keeping the two ends 36, 37 of the chisel edge 35 at the same axial height. On the other hand, the two ends 36, 37 of the chisel edge 35 may be situated at different axial heights because such a design may advantageously suppress vibrations.

Figure 8:
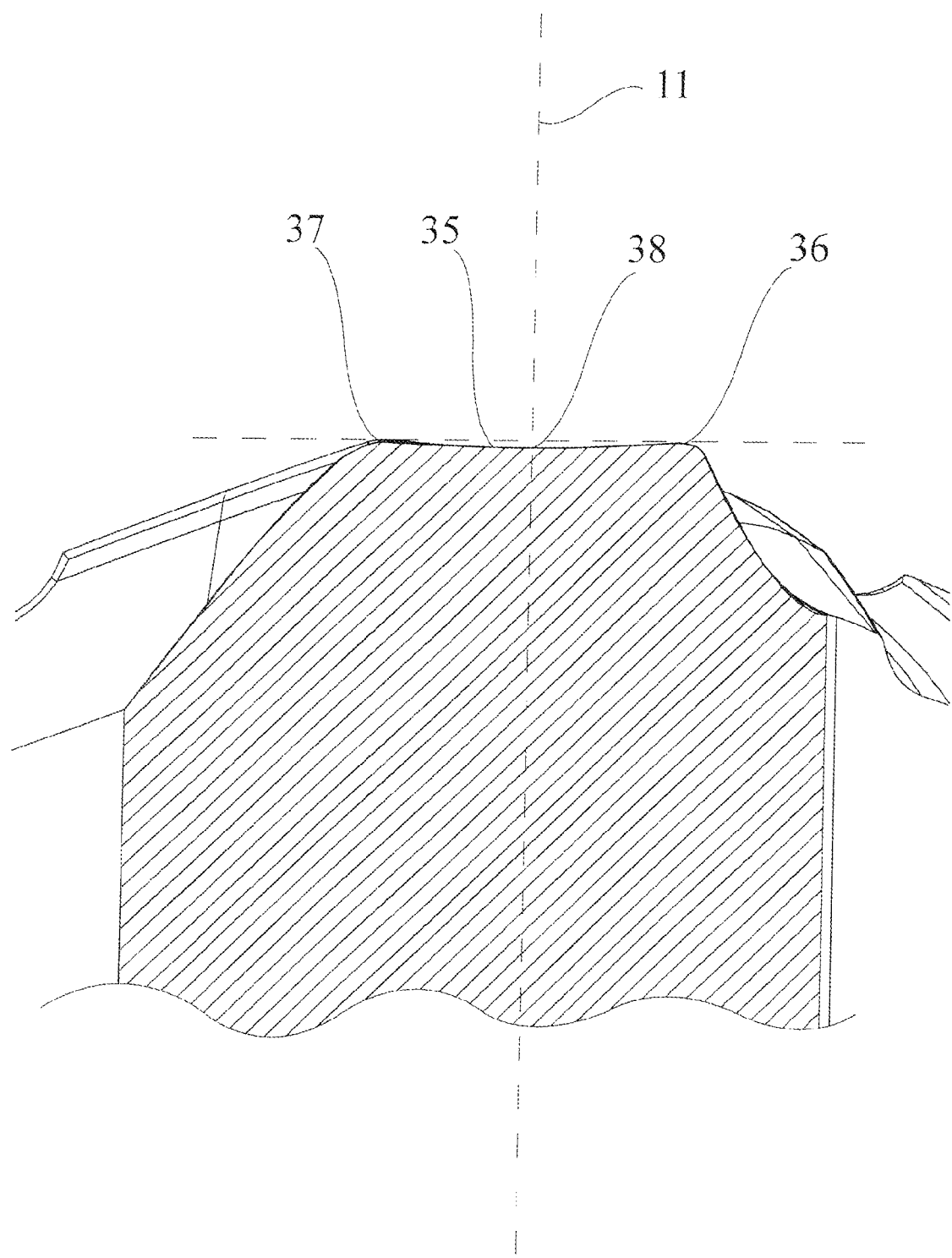
FIG. 8 shows the blades of FIG. 6 in a sectional view along the section line VIII-VIII.

FIG. 8 clearly shows that the two ends 36, 37 of the chisel edge 35 are dip site and/or kink sites. This feature jointly with the axial protrusion of the two ends 36, 37 and due to the small area of contact attains the above discussed force concentration advantageous to drilling progress.

Figure 6:
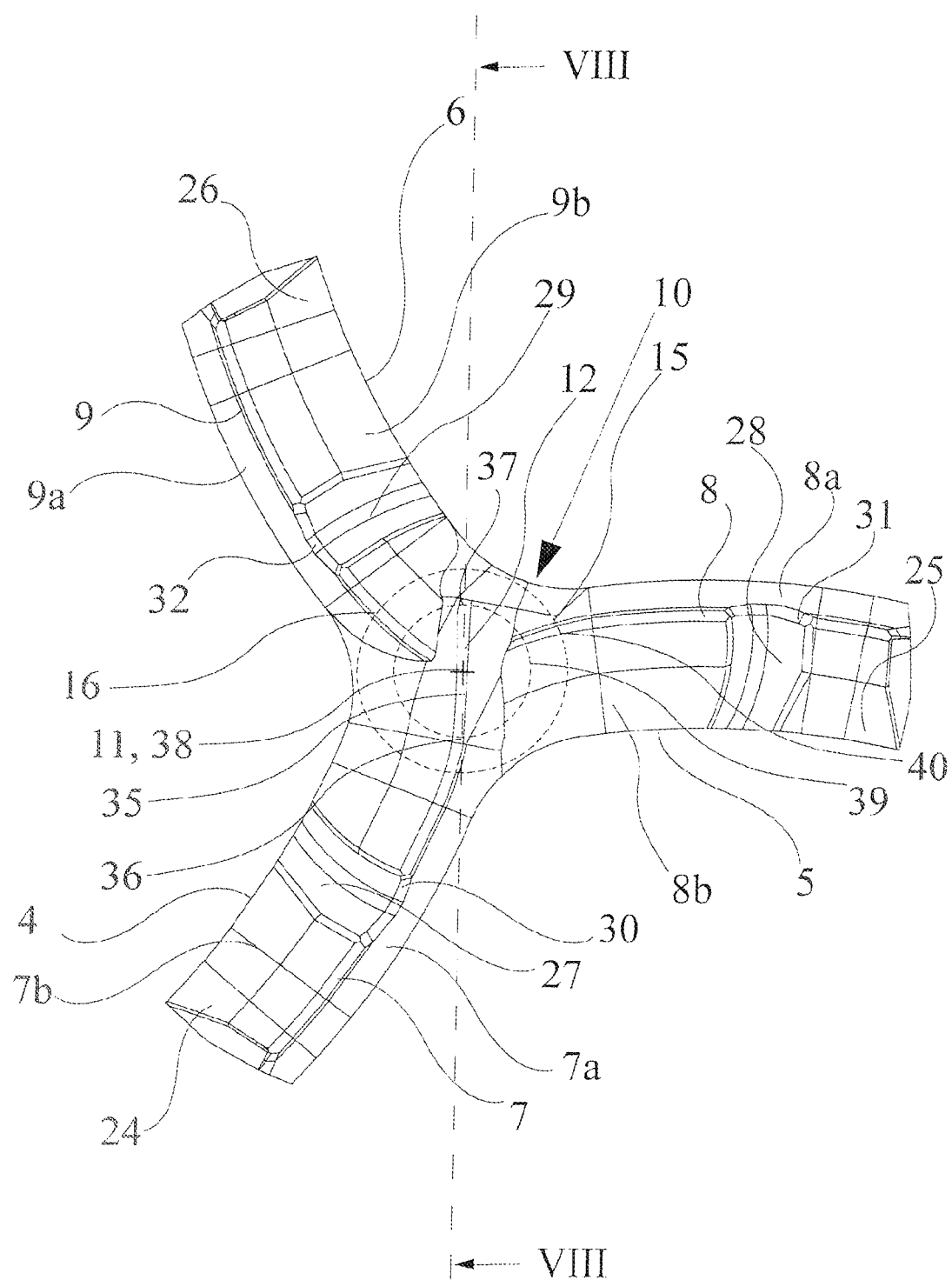
FIG. 6 shows in topview a further embodiment mode of the blades of a rock drill bit of the present invention.
Figure 7:
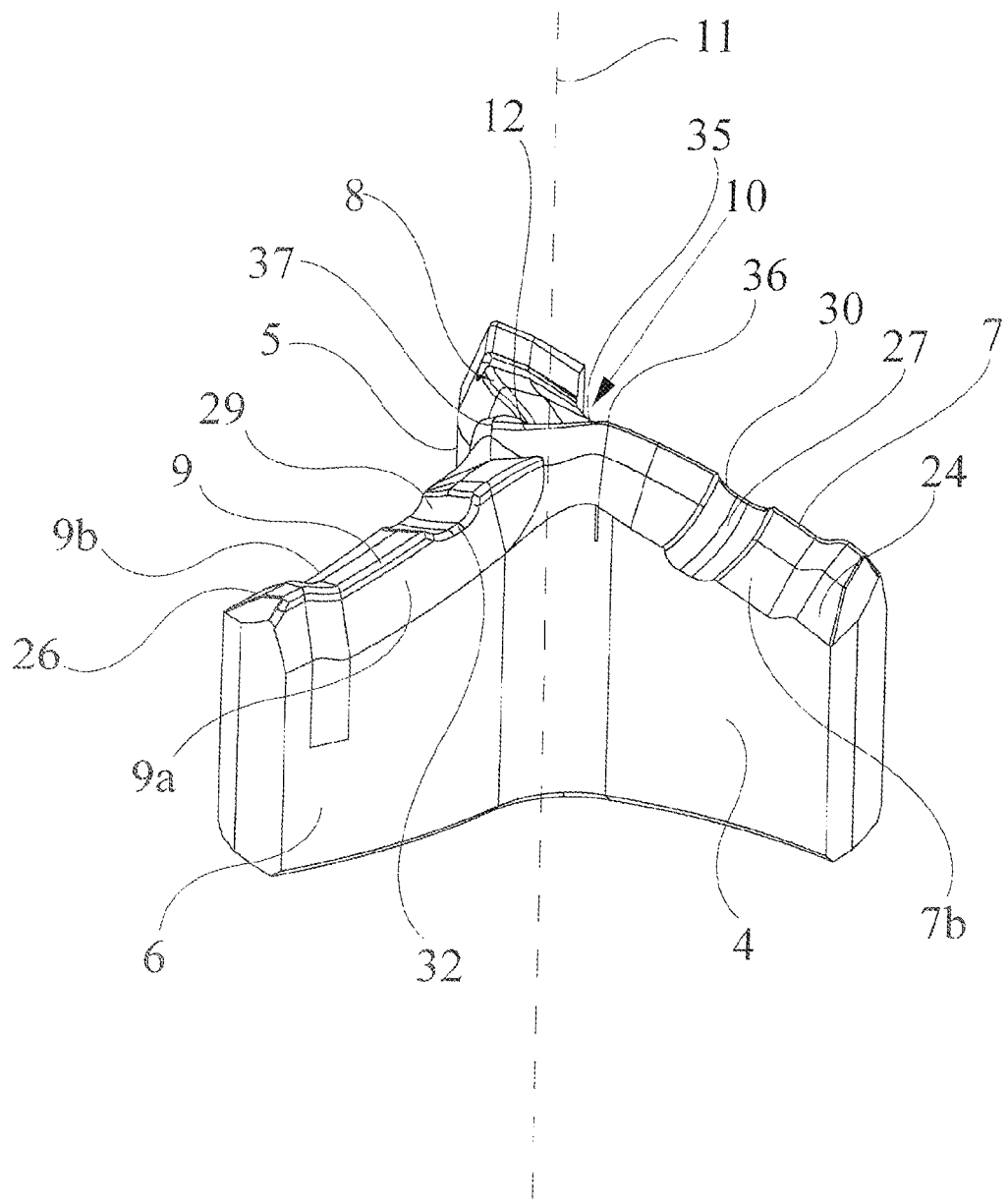
FIG. 7 is a perspective of the blades of FIG. 6.
Figure 9:
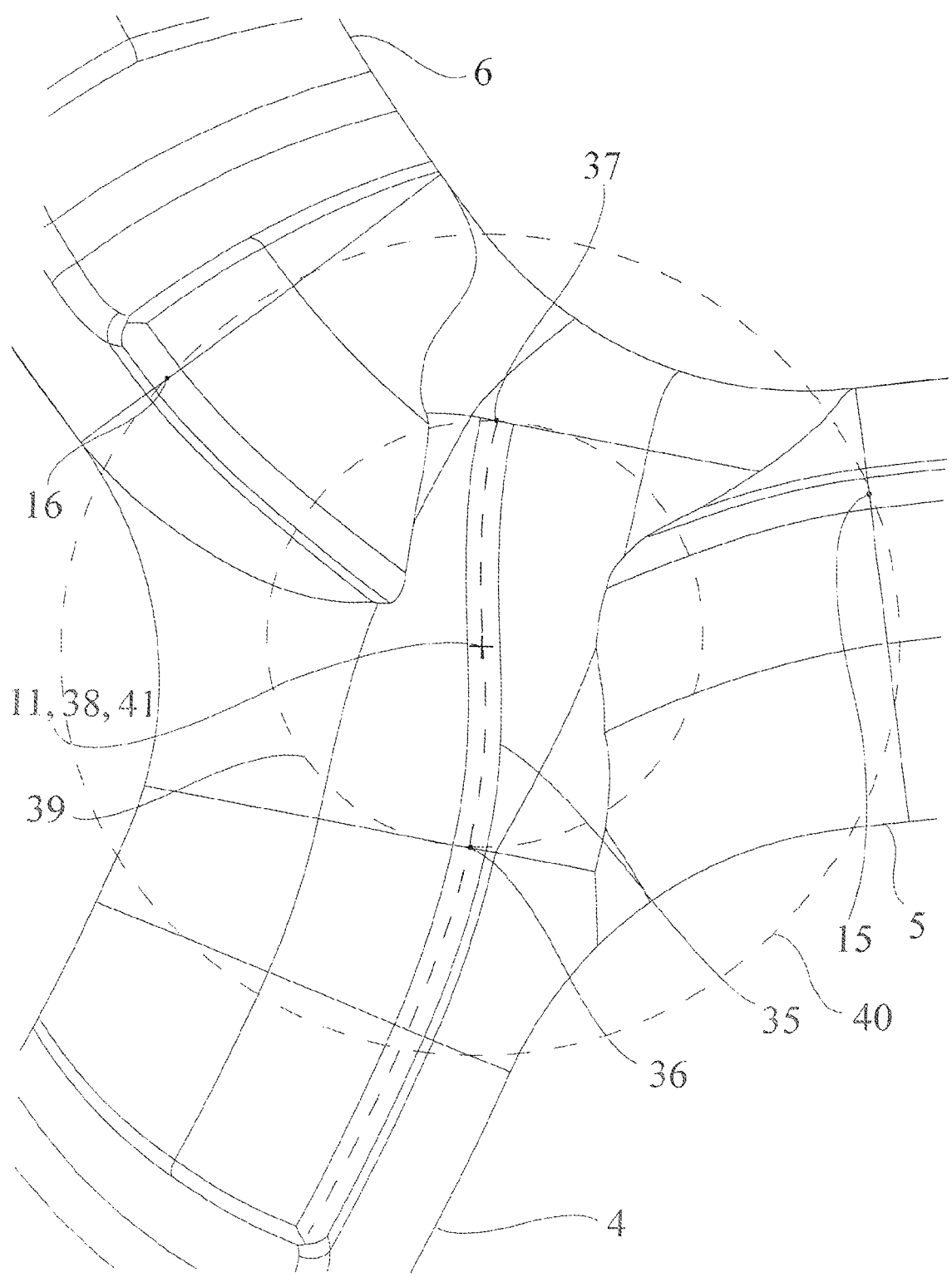
FIG. 9 is a much enlarged topview of the blades of FIG. 6.

FIGS. 6 and 9 show that the chisel edge 35 runs through the bit axis 11. Alternatively, or in addition, the center 38 of the chisel edge 35 may be situated precisely in the bit axis 11. This latter condition is indicated in FIG. 8.

To attain the also aforementioned degree of symmetry, preferably, when seen in top view, the two ends 36, 37 of the chisel edge 35 shall be situated on a circle 39 concentric with the bit axis 11. In this manner the chisel edge 35 is substantially concentric with the bit axis 11.

FIG. 8 indicates that preferably in this instance the chisel edge 35, as seen in sideview, shall be concave. In this design the chisel edge 35 preferably follows a continuous, curvilinear path. However the chisel edge 35 also may be fitted between its two ends 36, 37 with one or more kink sites.

As regards the embodiment mode shown in FIGS. 6 through 9, the other lips 8, 9—situated besides the long lip 7, the same as in the design of the embodiment shown in FIGS. 1 through 5—each comprise a kink site 15, 16 beginning at which the axial height of these blades 8, 9 decreases toward the bit axis 11. However in the latter embodiment mode, the kink site associated with the long lip 7 was replaced by an end 37 of the chisel edge 35.

The axial height at the kink sites 15, 16 is substantially identical for the two remaining lips 8, 9. Also, when seen in topview, the kink sites 15, 16 of the two remaining lips 8, 9 are situated on a circle 40 concentric with the bit axis 11. However, and preferably so, the axial height at the kink is sites 15, 16 for the two remaining lips 8, 9 each is always less than the axial height at the ends 36, 37 of the chisel edge 35. This feature reliably offers further increase in the force concentration in the ends 36, 37 of the chisel edge 35.

Furthermore as regards the shown and preferred embodiment mode, the circle 40 associated with the kink sites 15, 16 differs from the circle 39 associated with the ends 36, 37. In this instance, the circle 39 relating to the ends 36, 37 is smaller than the circle 40 relating to the kink sites 15, 16.

In principle it may be advantageous that, when seen in topview, the chisel edge 35 shall be straight. On the other hand the chisel edge 35 shown in topview in FIG. 9 assumes an S shape. Experiment has shown that such an S-shaped chisel edge allows operating at very low vibrations. Best results are attained when the inflection point 41 of the chisel edge 35 intersects the bit axis 11.

FIGS. 10 through 16 show a further preferred embodiment modes of a rock drill bit of which the basic design corresponds to that of the embodiments shown in FIGS. 1 through 9, in this instance however the central zone 10 being vaster in the above sense. To that extent all previous discussions also apply to the embodiments of FIGS. 10 through 16.

The embodiment modes shown in FIGS. 10 through 16 allow a larger overshoot segment 12 of the long lip 7. Seen in topview, the mutually facing sides of adjacent blades 4, 5, 6 merge into one another by a junction element 42, 43, 44. Preferably part of said junction elements are substantially identically shaped as seen in topview.

An inner circle 45 is defined and assumes special significance for the embodiment modes of FIGS. 10 through 16, which is centered on the bit axis 11 and is situated entirely within the drilling tip 3; at east one of junction elements 42, 43, 44 hugs it when seen in topview.

In an especially preferred design, the chisel edge 35 of the embodiment modes being presently discussed has been broadened to an extent that its ends 36, 37 now are situated on the inner circle 45 and even outside it. Additional support measures are required by the widened chisel edge 35 in the above sense and are elucidated further below.

In principle the overshoot segment 12 of the long lip 7 might terminate at the inner circle 45. However an especially preferred design is shown in FIGS. 10 through 16 where the overshoot segment 12 of the long lip extends outside the inner circle 45.

The above lengthening of the overshoot segment 12 of the long lip 7 may be implemented, with due respect for practice, by fitting one of the junction elements 43 with a lateral projection 46 that supports part of the overshoot segment 12, in particular the terminal position of the long lip 7, and/or receives it. The lateral projection 46 thus is a radial widening of the particular junction element 43 to act like a substrate for the overshoot segment 12 of the long lip 7. Accordingly one part of the overshoot segment 12 of the long lip 7 is configured on the lateral projection 46. On one hand this feature allows optimally supporting the long lip 7 and on the other hand increasing the freedom of design of the latter segment of the long lip 7.

The single lateral attachment 46 shown here and preferably the only one when seen in topview is situated outside the inner circle 45 and ensures a given asymmetry in the central zone 10.

Moreover using a single lateral attachment 46 as shown in FIGS. 10 through 16 as preferred embodiment modes also is appropriate due to only a single overshoot segment 12 being used. On the other hand and as already mentioned above, it might be advantageous in manufacturing that at least one further junction element and preferably all junction elements 42, 43, 44 be fitted with an identical attachment 46 respectively identical attachments.

In the topviews shown in FIGS. 10 through 12 and 16, the lateral attachment 46 is shown as a separate part. These Figures are displayed as shown only for clarity. In fact the attachment 46 indicated therein is integral with the blades 4, 5, 6.

In the illustrative preferred embodiment shown in FIG. 10, the lateral attachment 46 runs over the full axial length of the associated junction element 43, the results of which regarding connecting the blades 4, 5, 6 to the shank 1 will be elucidated further below. However the lateral attachment 46 might also run over an axial, upper part of the associated junction element 43 and in this manner constitute an axial overhang. This geometry is shown at the top of FIG. 11 and, as elucidated further below, also is advantageous regarding joining the blades 4, 5, 6 to the shank 1.

Figure 10:
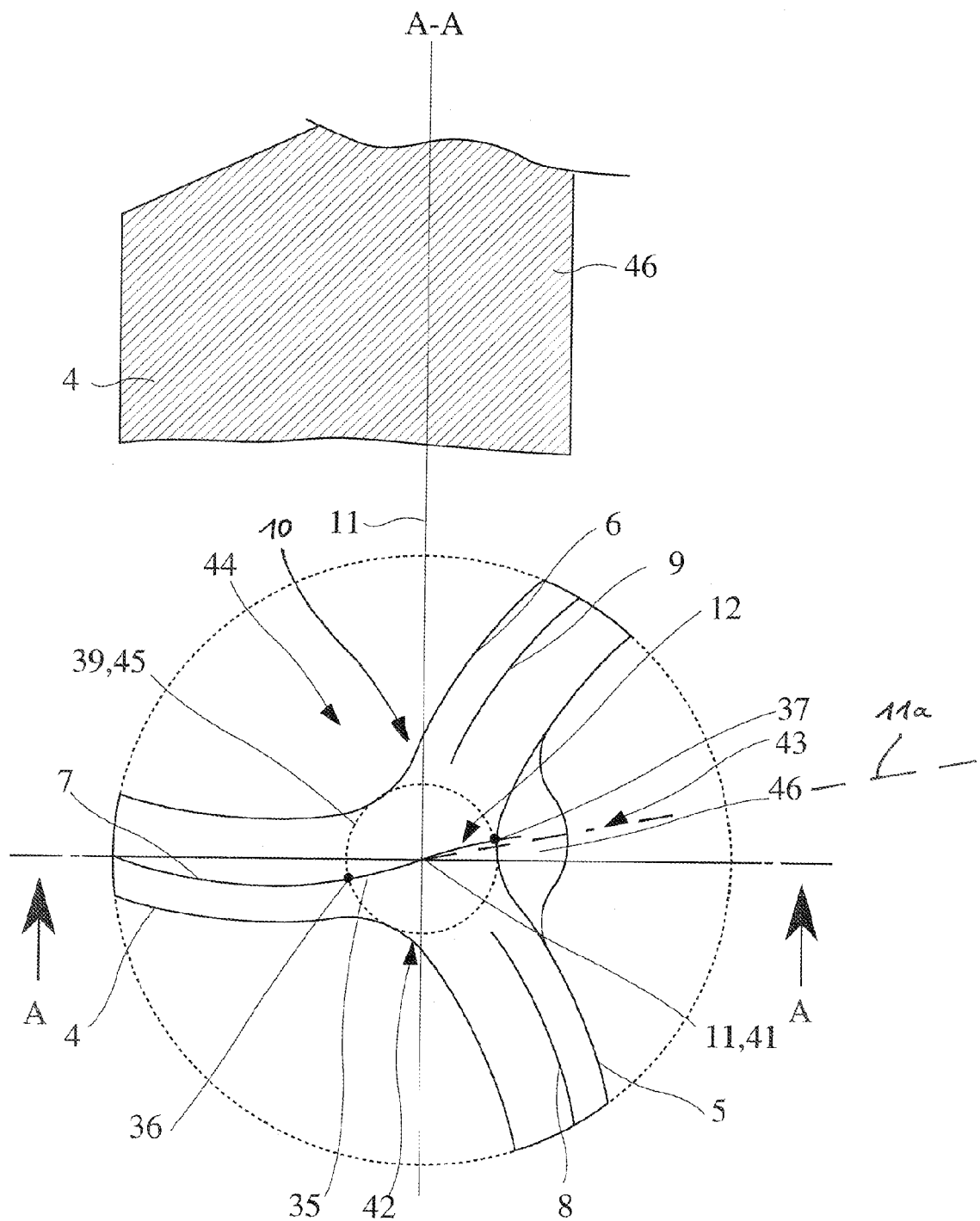
FIG. 10 shows a topview of a further illustrative embodiment mode of the blades of a rock drill bit of the present invention and also a sectional view along the line A-A.
Figure 11:
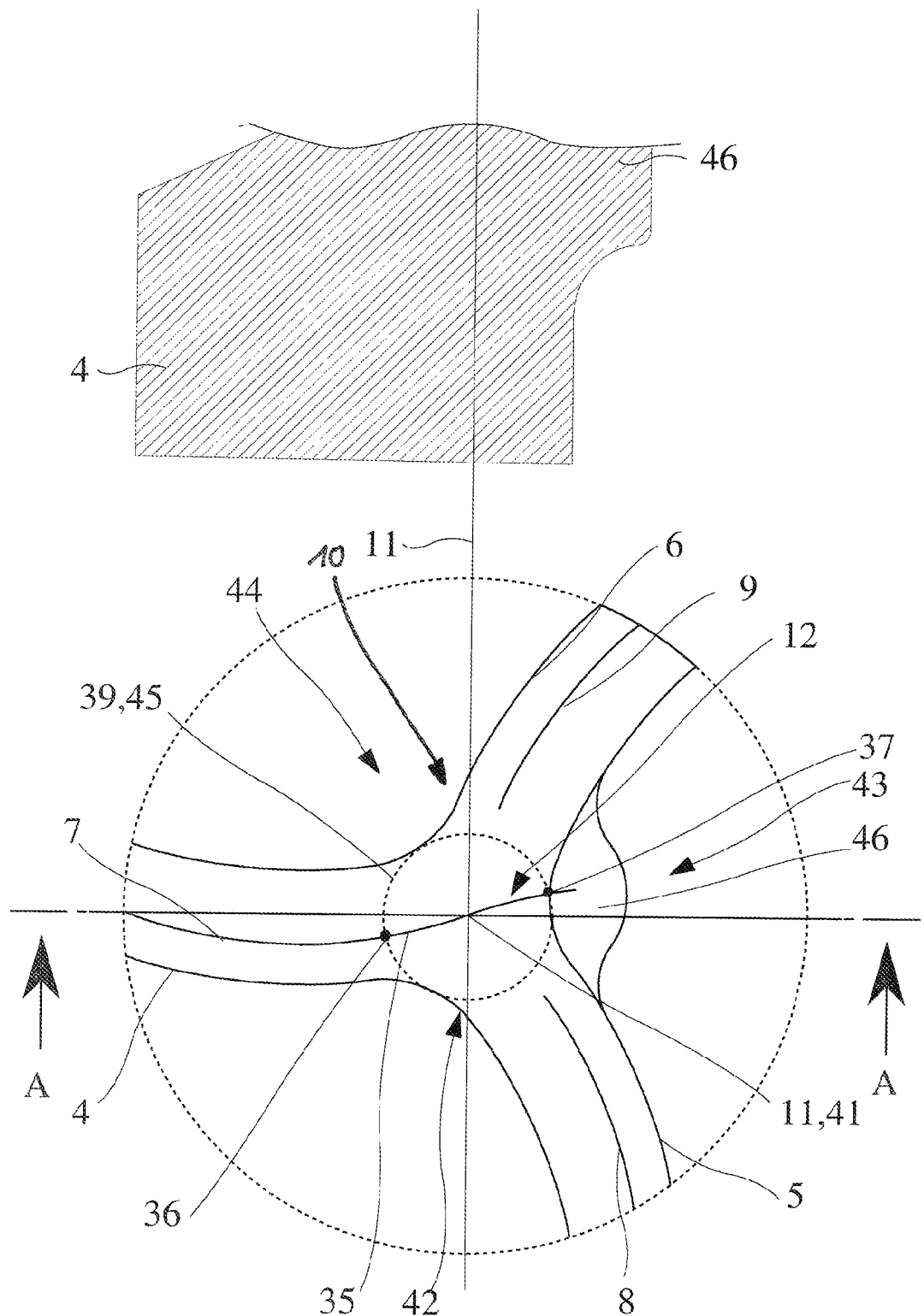
FIG. 11 shows a topview of a further illustrative embodiment of the blades of a rock drill bit of the present invention and in a sectional view along line A-A.

As regards the illustrative embodiment modes shown in FIGS. 10 and 11, the lateral attachment 46 as seen in topview is aligned above the overshoot segment 12 of the long lip 7. In other words, to a first approximation, the lateral attachment 46 is shaped around the overshoot segment 12 of the long lip 7. This feature is implemented for instance in the embodiment modes shown in FIGS. 10, 11 and 13 through 16 in that, in topview, the lateral attachment 46 is substantially convex.

The above alignment of the lateral attachment 46 with the overshoot segment 12 of the long lip 7 is advantageous, but not mandatory, with respect to the ensuing support of said segment 12. In principle the lateral attachment 46 and the overshoot segment 12 may be geometrically diverging when seen in topview.

The embodiment modes of FIGS. 10 and 11 show, in topview, the significant feature that the lateral attachment 46 is substantially mirror-symmetrical about a radial straight line 11*a* solely shown in FIG. 10.

In this instance, the lateral attachment 46 when seen in topview is curvilinear to attain the always desired reduction of stress concentration.

Figure 12:
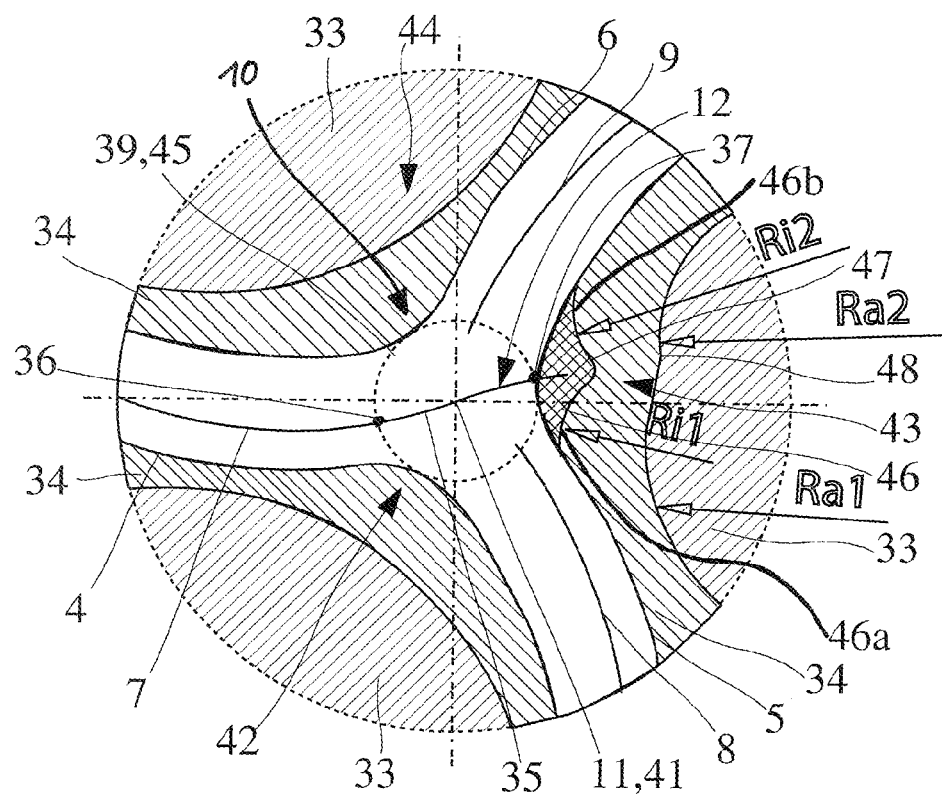
FIG. 12 is a topview of a further illustrative embodiment mode of a rock drill bit of the invention.
Figure 13:
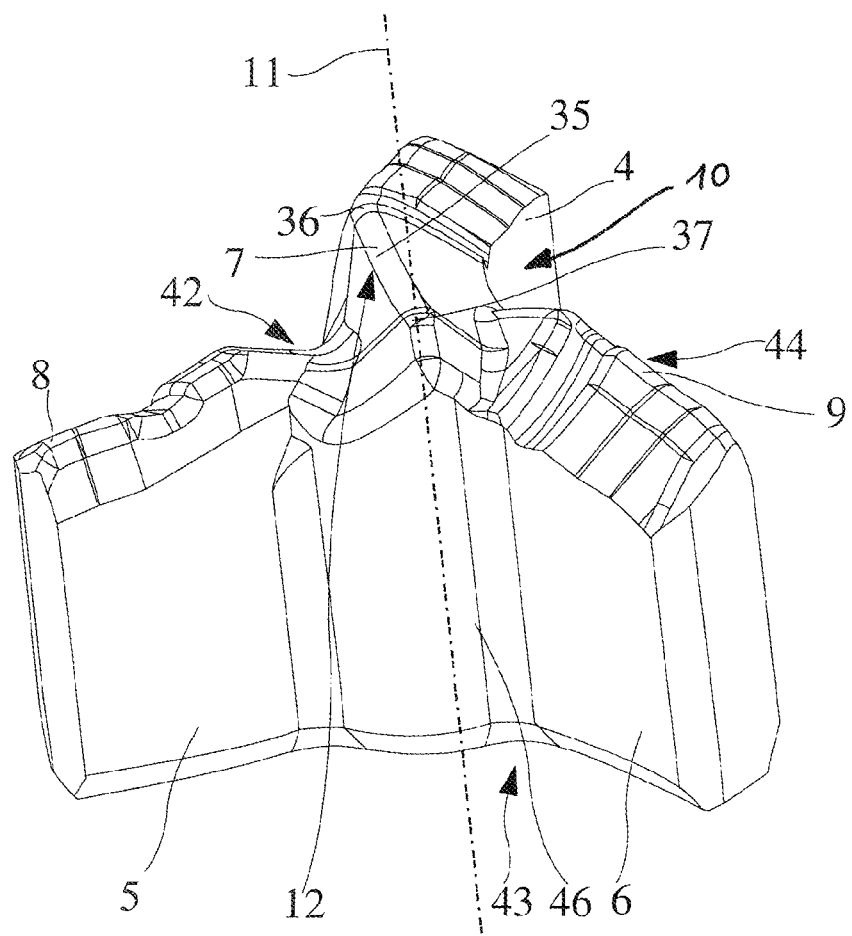
FIG. 13 is a perspective of a further illustrative embodiment mode of the blades of a rock drill bit of the invention.
Figure 14:
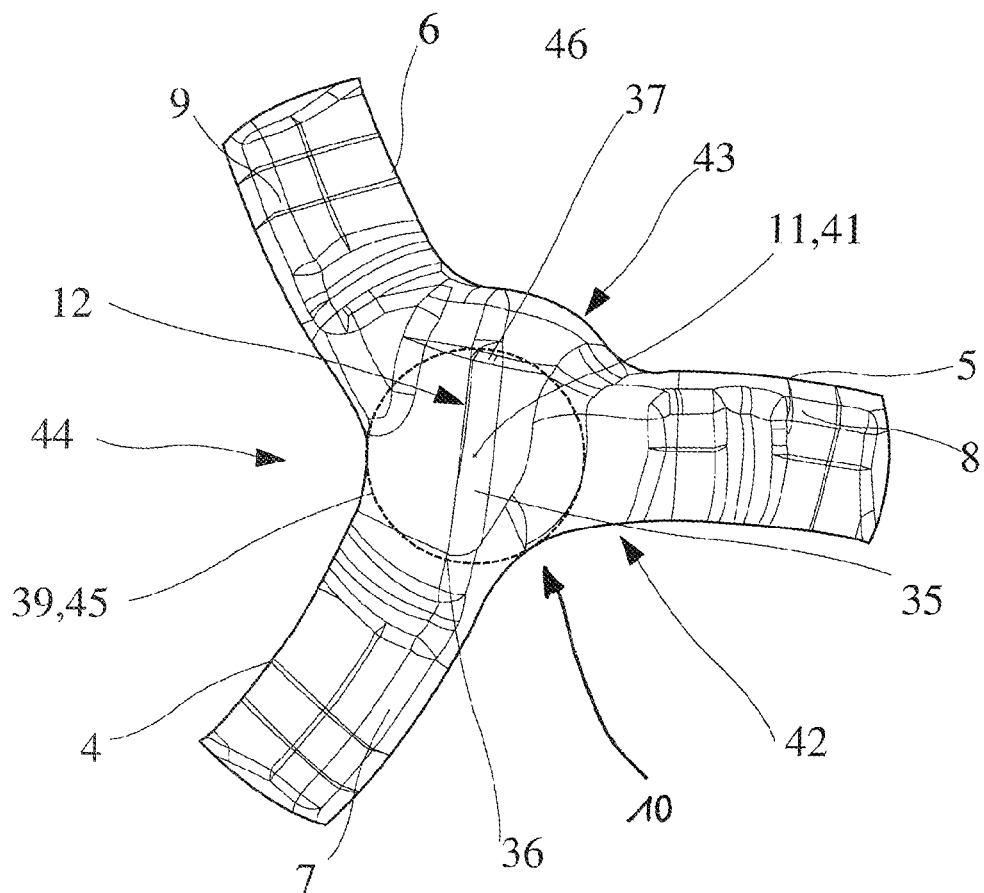
FIG. 14 is a topview of the blades of FIG. 13.
Figure 15:
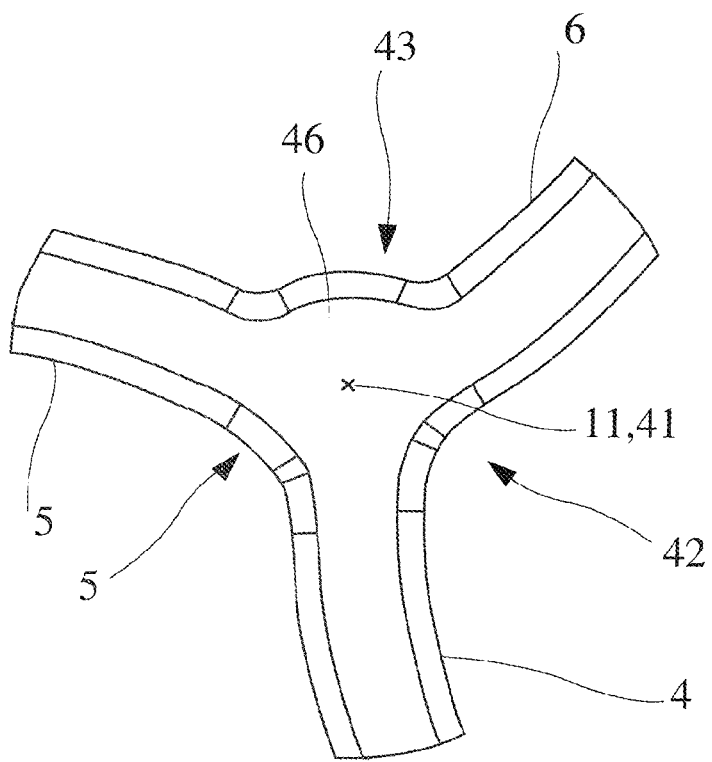
FIG. 15 is a view from below of the blades of FIG. 13.

In the preferred embodiment shown in FIG. 12, on the other hand, the lateral attachment 46 seen in topview comprises two segments 46*a*, 46*b* converging toward each other to subtend a peak. Be it noted that FIG. 12 is a topview of the drill bit and that the shaded areas are not sectional.

The terminal segment of the overshoot segment 12 of the long lip 7 points at the peak 47. This design is based on the insight to configure the overall attachment around the overshoot segment 12 of the long lip 7. In principle the lateral attachment 46 may assume another attitude on one hand and the overshoot segment 12 on the other hand.

The peak 47 of the attachment 46 is implemented in that, in topview, the two segments 46*a*, 46*b* be made arcuate, in this instance even being arcs of circle, the radii Ri1 and Ri2 as well as the related centers of the two arcuate segments 46*a*, 46*b* in each case being different. Be it borne in mind that the peak 47 shown in FIG. 12 is actually an axial edge.

Preferably as regards all shown embodiment modes, the blades 4, 5, 6 together constitute a preferably integral operational component inserted in form-fit manner into corresponding and substantially groove-shaped connecting recesses in the shank 1. Such operational components in general are hard-metal inserts.

In the embodiment modes shown in FIGS. 10 and 12 through 16, the lateral attachments each run over the entire axial length of the associated junction element 43. This shows up very clearly when jointly looking at FIGS. 13 through 15. These Figures also show that using an attachment 46 necessarily entails enlarging the associated connecting recesses.

The above mentioned enlargement of the connecting recesses is some cases may raise problems due to the entailed reduction in wall thickness in the shank 1. In such a case, the upper design shown in FIG. 11 is especially advantageous. The axial size of this lateral attachment 46 is carefully selected so that, in its inserted state, it fails entirely to reach the connecting recesses and runs solely above the end face 34 of the shank 1. As regards the end face 34 of the shank 1, the lateral attachment 46 constitutes an above discussed overhang. As a result, enlarging the connecting recesses and thereby reducing the wall thickness in the shank 1, can be correspondingly dropped.

FIG. 12 also shows the optimized design of the residual wall thickness in the shank 1 where the lateral attachment 46 runs over the full axial length of the associated junction element 43. In this embodiment mode, an evacuation groove 33 for drilling dust/chips (bottom left to top right shading) is used in the region of the drilling tip 3 and runs as far as the end face 34 (top left to bottom right shading) of the shank 1. The evacuation groove 33 already was discussed in relation to the embodiment mode shown in relation to FIGS. 1 through 5.

It was observed regarding the design of the preferred embodiment shown in FIG. 12 that both the evacuation groove 33 and the connecting recesses in the shank 1 will decrease the pertinent wall thickness of this shank 1. Accordingly the embodiment mode shown in FIG. 12 provides that, as seen in topview, the shape of the side face of the evacuation groove 33 shall substantially correspond to the shape of the side face of the lateral attachment 46 (criss-cross shading), as a result of which the remaining wall thickness of the shank 1 between the lateral attachment 46 and the evacuation groove 33 of the shank 1 shall be substantially constant along said groove. Accordingly, and as seen in topview, the evacuation groove 33 of FIG. 12 indicates a peak 48 which in sideview appears as an axial edge.

Figure 16:
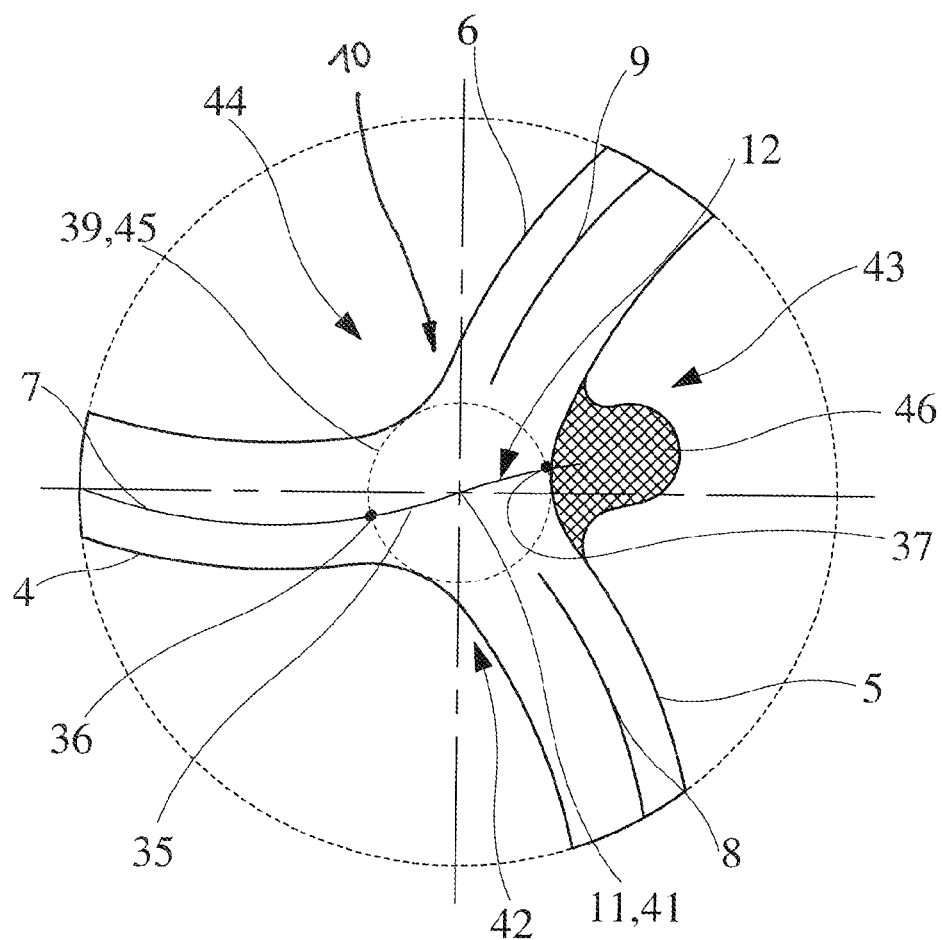
FIG. 16 is a further topview of an illustrative embodiment of a rock drill bit of the invention.

The illustrative embodiment of FIG. 16 shows an especially effective support means for the overshoot segment 12 of the long lip 7. In this instance, and as seen in topview, the lateral attachment 46 projects like a finger, its longitudinal extent being substantially opposite that of the blade 4 fitted with the long lip 7. Using such a finger-like attachment 46 allows considerably extending the overshoot segment 12 of the long lip 7 at little cost in additional material. Such saving in material is especially significant when the insertion element is made of a hard metal.

Preferably the finger-like attachment 46 runs along a curving line. This curve may be the one followed by the long lip 7. In the embodiment mode of FIG. 16, this curve is the end of the S-curve of the chisel edge 35. However the finger-like attachment also might run along that curve which is followed by the blade 4 receiving the long lip 7. Further embodiment modes are feasible.

In particular as regards the design of the lateral attachment 46, it is possible to extend the overshoot segment 12 of the long lip 7—as already explained—into a further region. In that case preferably the length of the overshoot segment 12 of the long lip 7 is larger than half the width of the blades 4, 5, 6. The term "width" of the blades 4, 5, 6 in this case denotes the width measured perpendicularly to the direction of the particular blade 4, 5, 6. If the width of the blades 4, 5, 6 should vary along their lengths, then it is defined as the averaged width of the radially outer half of the particular blade 4, 5, 6. In particular if the external dimensions of the blades 4, 5, 6 should differ among each other, the width in the sense herein shall be ascertained from one of the two blades 5, 6 that do not receive the long lip 7.

Lastly it may be borne in mind that the overall shape of the central zone 10 when seen in sideview in principle may be concave, convex, or even converging into a tip. These alternatives must be selected according to each application. In an especially preferred embodiment mode, the recess in the central zone 10 projects from the rock drill bit elsewhere. In this manner a centering effect may be attained.

The invention claimed is:

1. A rock drill bit comprising:
a shank fitted with a clamping end and a drilling tip at the end away from the clamping end,
wherein
the drilling tip comprises at least three blades curved relative to the cutting direction of rotation of the rock drill bit such that they are alar in topview, said blades each comprise, at their top side a lip constituted by a leading chipping face and a trailing flank, the lips substantially converging onto each other within a central zone centered on the drill bit axis,
in the central zone, a single lip that is long runs through the drill bit axis and comprises a commensurate overshoot segment extending beyond the drill bit axis, and
in the vicinity of the drill bit axis, the long lip constitutes a chisel edge, wherein said chisel edge has an edge profile different from that of another portion of the long lip and said chisel edge comprises two radially outer ends axially projecting from the in-between center of said chisel edge.

2. The rock drill bit as claimed in claim 1, wherein a length of the overshoot segment of the long lip is larger than 3% or 5% of a bit diameter.

3. The rock drill bit as claimed in claim 1, wherein a length of the overshoot segment of the long lip is less than 20% or 10% of a bit diameter.

4. The rock drill bit as claimed in claim 1, wherein, as seen in a top view, said lips of the corresponding three blades comprises a first lip, a second lip, and said long lip, and the flank of the first lip and the flank of the second lip subtend a recess in the central zone, the long lip running through said recess.

5. The rock drill bit as claimed in claim 1, wherein, as seen in a top view, the lips of the blades run from the inside to the outside along an arc and a curvature of the lips within the central zone substantially corresponds to the curvature of the lips outside of the central zone.

6. The rock drill bit as claimed in claim 1, wherein, as seen in a top view, the lips of the blades run from the inside to the outside along an arc having a direction of curvature opposite to a rotation direction of the rock drill bit.

7. The rock drill bit as claimed in claim 1, wherein the flanks of the lips each are fitted with at least one substantially concave recess extending through the corresponding flank.

8. The rock drill bit as claimed in claim 1, wherein axial heights of both ends of the chisel edge are substantially identical.

9. The rock drill bit as claimed in claim 1, wherein the chisel edge runs through the drill bit axis.

10. The rock drill bit as claimed in claim 1, wherein, as seen in a top view, two ends of the chisel edge are situated on a circle centered on the drill bit axis.

11. The rock drill bit as claimed in claim 1, wherein, as seen in a side view, the chisel edge is concave.

12. The rock drill bit as claimed in claim 1 wherein the lips of the at least three blades comprises a first lip, a second lip and the long lip, each of the first and second lips includes a dip site from which the axial height of the corresponding lips decreases toward the drill bit axis.

13. The rock drill bit as claimed in claim 12, wherein the axial height at the dip sites is less than the axial height at the ends of the chisel edge.

14. The rock drill bit as claimed in claim 1, wherein, as seen in a top view, the chisel edge runs rectilinearly or is S-shaped.

15. A rock drill bit comprising:
   a shank fitted with a clamping end and a drilling tip located away from the clamping end, wherein the drilling tip comprises at least three blades curved relative to the cutting direction of rotation of the drilling tip such that they are alar in topview, said blades each includes, on respective top sides thereof, a lip constituted by a leading chipping face and a trailing flank, the lips substantially converging onto each other within a central zone centered on the drill bit axis, in the central zone, a long single lip runs through the drill bit axis and comprises a commensurate overshoot segment extending beyond the drill bit axis, and in the vicinity of the drill bit axis, the long lip has a chisel edge and said chisel edge comprises two radially outer ends axially projecting from the in-between center of said chisel edge, at least one of the radially outer ends being located away from all of the ends of the long lip.

* * * * *